Patented Aug. 21, 1928.

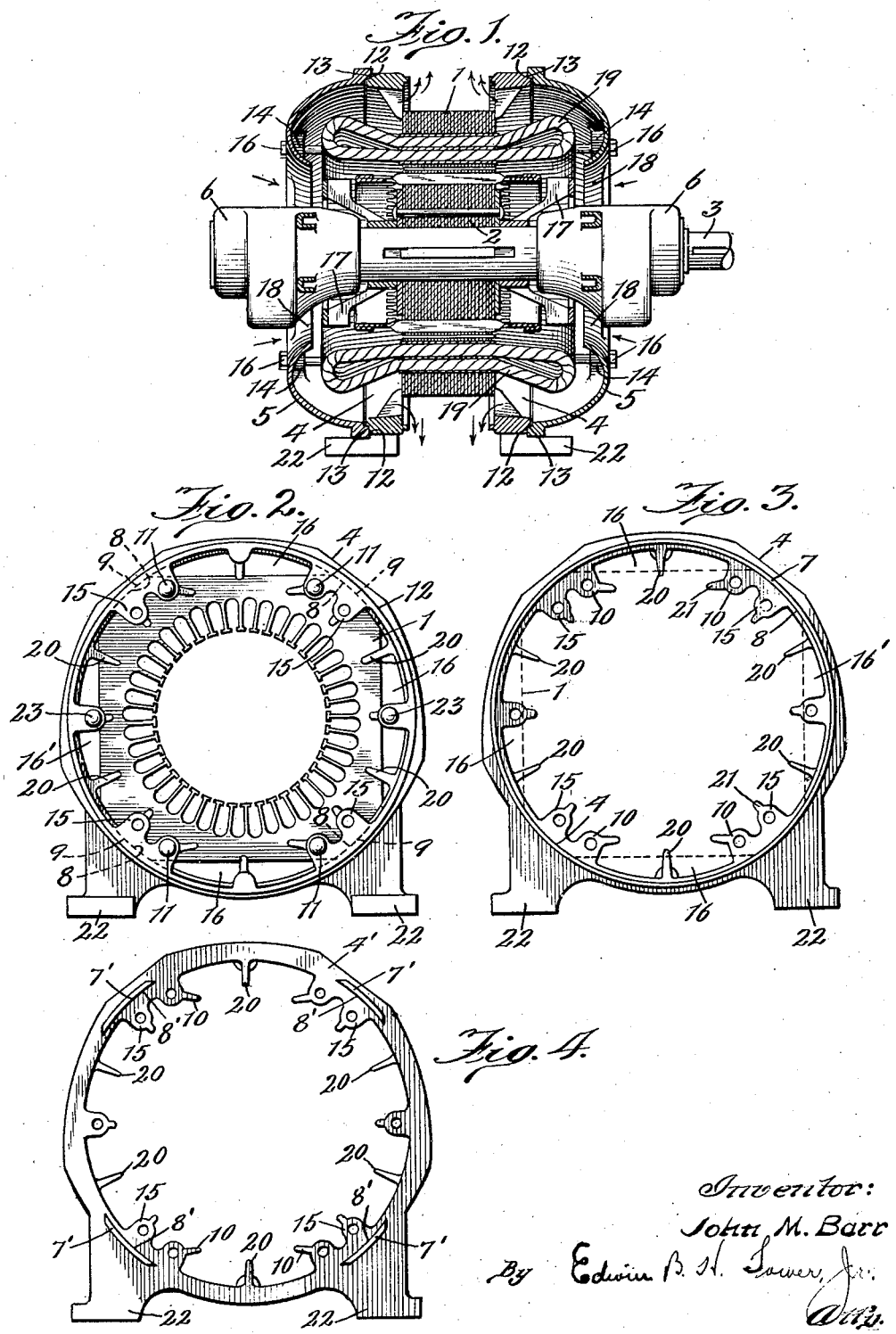

1,681,916

UNITED STATES PATENT OFFICE.

JOHN M. BARR, OF MILWAUKEE, WISCONSIN, ASSIGNOR TO THE LOUIS ALLIS COMPANY, OF MILWAUKEE, WISCONSIN, A CORPORATION OF WISCONSIN.

DYNAMO-ELECTRIC-MACHINE STATOR.

Application filed February 18, 1924. Serial No. 693,615.

This invention relates to a dynamo electric machine stator.

The stator to which this invention applies is provided with separate end frames, a core arranged between these frames and having a central opening for the rotor, and an end casing carried on each end frame and having a bearing for the rotor shaft.

The object of the invention is to center the end frames, the core and the end casings, and hold the same in alinement.

Another object of the invention is to provide a dynamo electric machine stator which is strong, durable and compact, and which may be readily and economically manufactured.

According to the invention, each end frame is provided with concentric inward and outward lateral flanges and inward radial lugs and these inward and outward lateral flanges center the core and the end frames and hold the same in alinement.

The accompanying drawings illustrate a stator made in accordance with the invention and the views therein are as follows:

Fig. 1 is a central longitudinal section of a dynamo electric machine.

Fig. 2 is an end elevation of the stator with the end casing removed.

Fig. 3 is an end elevation of the end frame.

Fig. 4 is an end elevation of an end frame of modified form.

The dynamo electric machine in which the stator may be employed has a stator core 1 and a rotor 2 arranged therein and carried by a shaft 3.

The core is supported at each end by an end frame 4, and a rotor is supported by end casings 5 arranged on the end frames and having bearings 6 for the rotor shaft.

The end frames have inward lateral flanges 7 provided with inner faces 8 to receive the outer corners 9 of the stator core.

The stator core may be composed of substantially square laminations and the outer corners 9 of the core are concentric with the pole face thereof so that when the stator is assembled the pole face of the core is concentric to the lateral flanges on the end frames.

Each end frame is provided with lugs 10 which receive rods or rivets 11 to hold the core laminations and end frames firmly together.

An end frame 4 is laid upon an assembly table so that the supporting flange 7 and the rivets 11 extend upwardly.

The core laminations are then piled upon this end frame. The rivets 11 extend through holes at the corners of each lamination.

A second end frame is then placed upon the pile with its supporting flange 7 facing downwardly.

The ends of the rivets 11 extend a short distance beyond the outer face of this second end frame.

A mandrel is then placed through the opening in the core and expanded to true up the laminations.

The mandrel, end frames and core are then placed in a press and subjected to great pressure.

The ends of the rivets 11 are then heated and pressed flat to firmly hold the core laminations and end frames together.

The mandrel, carrying the core and end frames, is then placed in a lathe and flanges 12 are machined on the outer face of each end frame to be concentric with the inward lateral flange 7 and with the pole face of the stator core.

Each end casing 5 is placed in a lathe and the edge thereof is machined to provide a flange 13 to be concentric with the center of the bearing 6 and to fit the flange 12 of the end frames.

The inner face of each end casing 5 is provided with four bosses 14 arranged in the same relation with respect to each other as are lugs 15 with which each end frame 4 is provided. The lugs 15 are bored and tapped.

The end casings and end frames are fastened together by bolts 16 which are passed through the bosses 14 of the end casings and screwed into the lugs 15 of the end frames.

These bolts do not engage or pass through the core.

The stator thus provided has the rotor bearing accurately centered relative to the pole face of the core, and the end frames, core and end casings retained in permanent alinement.

The machine may be ventilated by fans 17 arranged on the rotor shaft to draw air into the machine through openings 18 in the end casings and direct the air against the windings 19.

The air may be discharged through openings 16' provided between the end frames and stator core, or in any other suitable position.

The end frames may be provided with lugs 20, and lugs 10 and 15 may be provided with lugs 21 to provide additional means to hold the stator core.

Some of these lugs may be provided with bolts or rivets 23 passing outside the stator core to aid in holding the core and end frames together.

The end frames may have supporting lugs 22 integrally cast therewith to support the machine on a base.

Access may be readily had to the interior of the machine and the rotor may be easily removed therefrom by removing the bolts 16 and end casing 5 at either end of the machine.

In the modification shown in Fig. 4, the supporting flange of the end frame 4' is not continuous, but comprises four flanges 7' arranged to engage the corners of the core. The inner faces 8' of these flanges 7' are arcs of the same circle.

Of course, this invention is susceptible of various modifications and adaptations which will be within the hereinafter claims.

What I claim is:

1. A stator for dynamo electric machines comprising separate end frames each having concentric inward and outward lateral flanges and inward radial lugs, a laminated core having a central circular pole face and outer corners concentric thereto and arranged between said end frames and held concentric thereto and in alinement therewith by said inward lateral flanges engaging said corners, bolts passing through said core near said corners and said inward radial lugs to hold said end frames and core together, and an end casing carried by each end frame and having a central bearing and an inward lateral flange concentric to said bearing and engaging said outward lateral flange to center said bearing relative to said pole face.

2. A stator for dynamo electric machines comprising separate end frames each having concentric inward and outward lateral flanges and inward radial lugs, a square laminated core having a central circular pole face and outer corners concentric thereto and arranged between said end frames and held concentric thereto and in alinement therewith by said inward lateral flanges engaging said corners, bolts passing through said core near said corners and said inward radial lugs to hold said end frames and core together, and an end casing carried by each end frame and having a central bearing and an inward lateral flange concentric to said bearing and engaging said outward lateral flange to center said bearing relative to said pole face.

In witness whereof, I have hereunto subscribed my name.

JOHN M. BARR.